United States Patent [19]

Breese

[11] 3,999,292
[45] Dec. 28, 1976

[54] PIPE CUTTING TOOL

[75] Inventor: Clinton E. Breese, Ponte Vedra Beach, Fla.

[73] Assignee: Breese Manufacturing, Inc., Jacksonville Beach, Fla.

[22] Filed: Sept. 29, 1975

[21] Appl. No.: 617,378

[52] U.S. Cl. .............................................. 30/105
[51] Int. Cl.² ................. B23D 21/10; B23D 21/14; B26D 3/16
[58] Field of Search ............ 30/105, 103, 104, 106, 30/107, 108

[56] References Cited

UNITED STATES PATENTS

| 1,830,207 | 11/1931 | Mueller | 166/55.7 |
| 3,911,574 | 10/1975 | Jones | 30/105 |

FOREIGN PATENTS OR APPLICATIONS

| 791,314 | 9/1935 | France | 30/105 |

Primary Examiner—Al Lawrence Smith
Assistant Examiner—J. T. Zatarga
Attorney, Agent, or Firm—George H. Baldwin; Arthur G. Yeager

[57] ABSTRACT

A pipe cutting tool particularly adapted for cutting off PVC waste pipe or the like below floor level, such as below the level of concrete in which the pipe is encased. The tool includes a depth gauge drum and cutter head mounted on a shaft adapted to be driven by an electric hand drill. The cutter head or drum carries a bit which is urged into the work by springs and which includes a leading guide leg or finger for controlling the depth of the cut and a trailing cutting leg spaced from the guide leg to permit clearance of cuttings.

10 Claims, 13 Drawing Figures

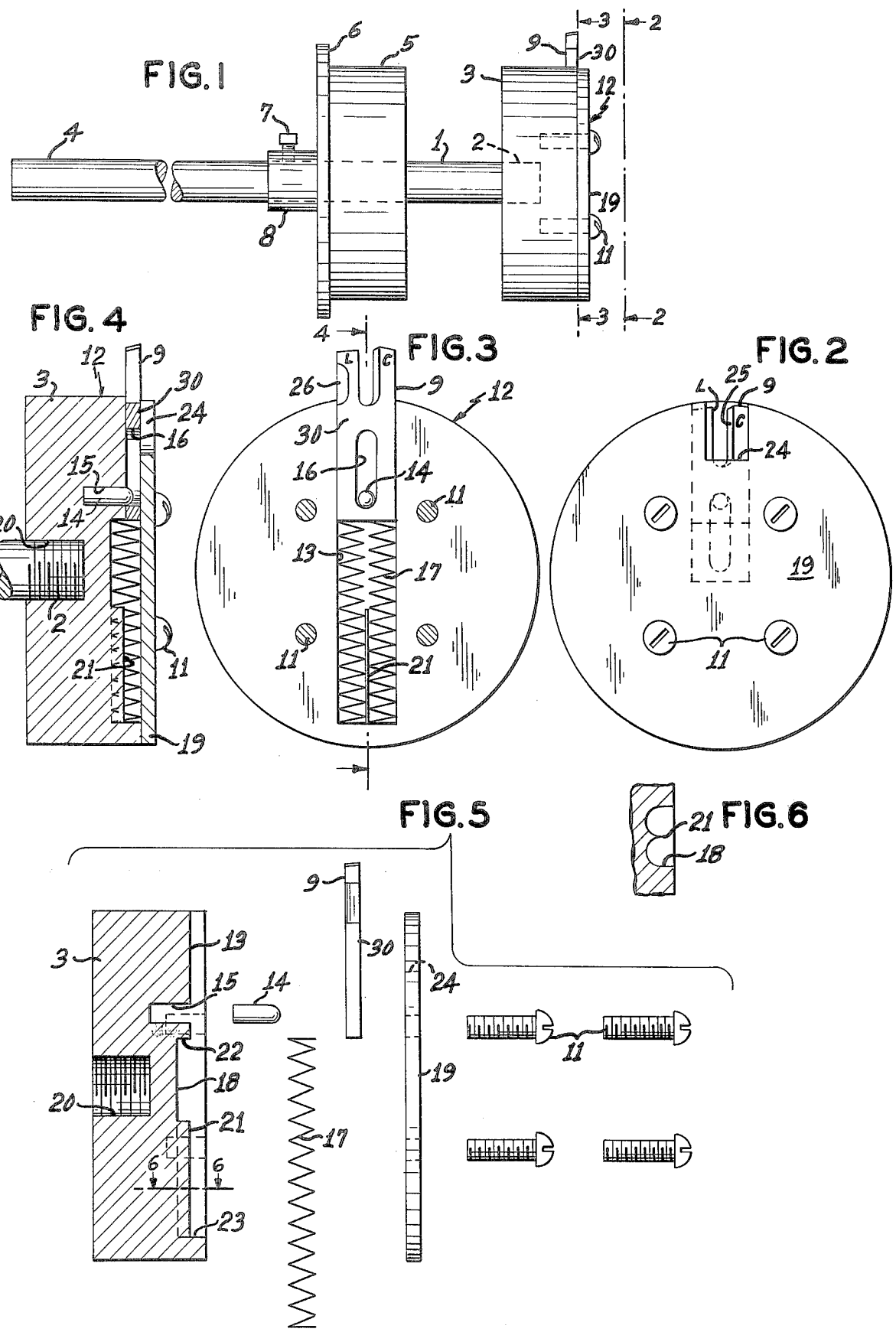

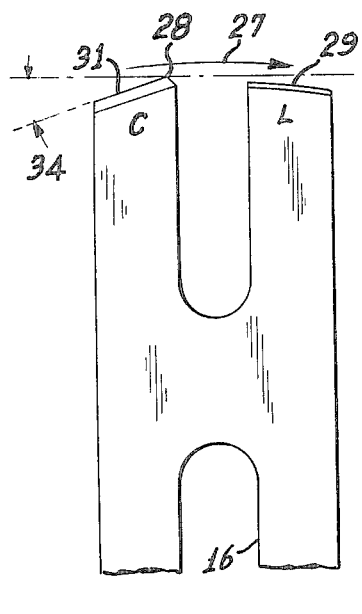
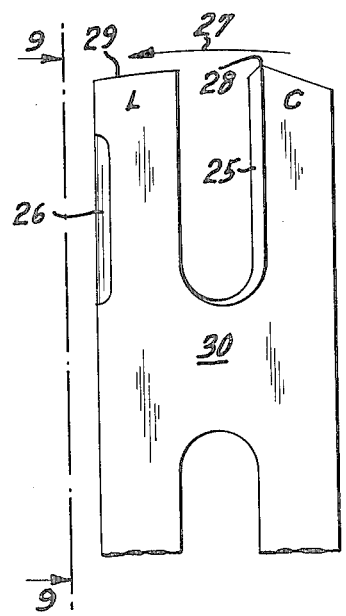
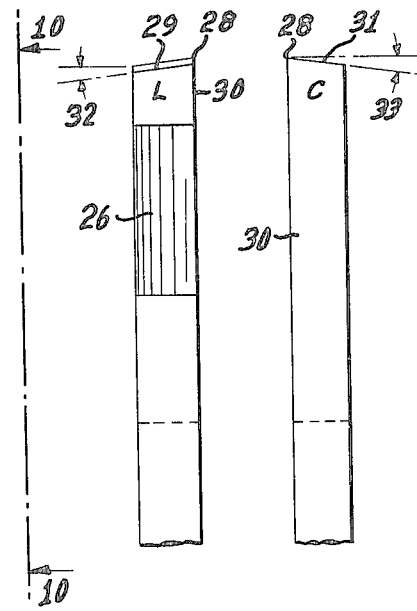
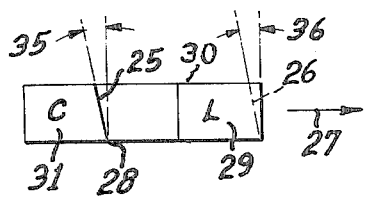
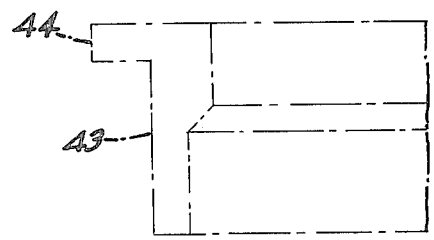
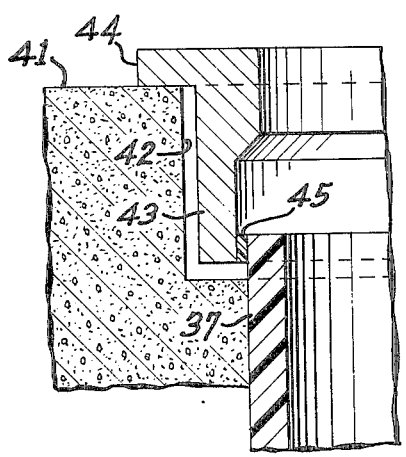
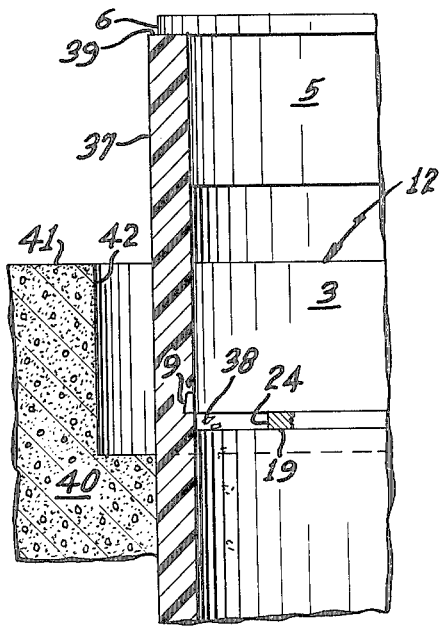

PIPE CUTTING TOOL

In the installation of toilet, shower and tub drains, it is common practice to locate PVC (polyvinyl chloride) waste pipes, typically, of 2, 3 or 4 inch diameter and with ¼ inch wall thickness, in desired positions, with the pipes extending somewhat above the final level, to then pour the concrete floor around the pipes, and, after the concrete has hardened, to cut off the waste pipes an inch or two below floor level.

While various internal pipe or tube cutters have been suggested, these tend to be complex, of high cost, slow in operation, and have either been difficult to control or have required repeated, time consuming adjustment as the cut deepens. For example, U.S. Pat. No. 3,883,950 - Kurtz is directed to an internal cutter for cutting plastic pipe encased in concrete, and U.S. Pat. No. 2,700,818 - Fisher shows an internal tube cutting arrangement including a depth gauge. Other U.S. Patents deemed of less pertinence to the present invention include No. 61,499 - Wright; No. 1,320,521 - Allison; No. 1,748,099 - Arnold; No. 2,764,812 - Thornson; and No. 2,842,843 - Willard.

An object of the invention is to provide a simple and inexpensive tool, which is simple to operate, requires minimal adjustment and which quickly and accurately cuts off a PVC or the like pipe at the desired depth within the pipe, to leave a cleanly finished end of the pipe from which the extra length has been cut.

A further object is to provide a tool which will cut off the pipe in a plane normal to the pipe axis.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a side elevation of a tool in accord with the invention and with the cutting bit fully extended;

FIG. 2 is an end view thereof taken along line 2—2 of FIG. 1, on an enlarged scale, showing the bit in fully retracted position;

FIG. 3 is a sectional view thereof taken along line 3—3 of FIG. 1 on the scale of FIG. 2 and showing the bit in fully extended position;

FIG. 4 is a sectional view taken along line 4—4 of FIG. 3;

FIG. 5 is an exploded view partially in section of the cutter head, or drum, assembly of the tool;

FIG. 6 is a detail sectional view taken along line 6—6 of FIG. 5;

FIG. 7 is a back elevational view of a portion of the cutter bit on a further enlarged scale;

FIG. 8 is a front elevational view of such portion similar to FIG. 7;

FIGS. 9 and 10 are side elevational views of such portion taken, respectively, along lines 9—9 and 10—10 of FIG. 8;

FIG. 11 is an end view of the bit on the scale of FIGS. 7 - 10;

FIG. 12 is a side elevational view, partially broken away and in section, on the scale of FIGS. 4 - 6, showing the tool in operative relation to a waste pipe and concrete floor and indicating, in broken lines and exploded position, a finishing flange for the pipe installation;

FIG. 13 is a view similar to FIG. 12 showing the completed pipe installation with the finishing flange in final position.

Referring to FIG. 1, the tool comprises a metal shaft 1, which may be, typically, about one foot in length, having a threaded round end portion 2, shown in broken lines, threaded into a solid metal drum or head member 3, and an opposite end portion 4 adapted for chucking in a ½ inch electric hand drill. Entrained on the shaft is a centering and depth-determining drum 5 including a laterally extending pipe-end-engaging flange 6 on its side away from the cutter drum or head assembly 2. The drum is slideable along the shaft and is lockable in selected position along the shaft by a set screw 7 threaded into collar 8 which is integral with the drum 5. The shaft 1 may be round as shown, or it may be of hexagonal cross section to provide additional strength and a better seat for the set screw. The shaft may further include depth scale markings therealong to aid in positioning the drum 5 for desired depths.

The cutter drum or head member 3 carries a cutter bit 9 retained by a face plate 19 held to the member 3 by four screws 11.

As seen in more detail in FIGS. 2 - 6, the cutter head assembly 12 comprises the cylindrical drum member 3 having a rectangular groove or channel 13 in which bit 9 fits with a sliding fit, a limit pin 14 fitted into a bore 15 in the drum member and extending into a delimiting slot 16 extending longitudinally of the bit, compression springs 17 retained in an enlarged extension 18 of channel 13, a flat face plate, front cover or retainer plate 19, and cover retaining machine screws or bolts 11. The back of the drum is bored and screw threaded as seen at 20 to mount the drum on the shaft. The enlarged channel for housing the springs may have a central partition 21 for separating and aligning the two springs, and a retaining lip 22 is preferably provided at the forward end of the spring channel 18 for convenience in assembly. Such assembly is accomplished by seating the springs against the seat 23 at the rear end of the spring housing channel and partially compressing the springs until they are disposed in channel 18 and retained between the seat and lip, by inserting pin 14 in its bore, positioning bit 9 in channel 13, and by then bolting the cover plate 19 to the drum. The bit or springs may be readily replaced by removal of the cover plate.

The bit is shown in FIGS. 3 and 4 in fully extended position with pin 14 engaged against the inner end of slot 16. The bit may be manually pushed against the springs into the fully retracted position shown in FIG. 2, thereby compressing the springs by forcing the spring ends away from lip 22. The channel 13 is proportioned to retain the bit in a close but freely sliding fit, both along the sides of the bit and between the cover plate and the bottom of the channel 13.

The operative end of the bit includes a leading leg L and a cutter leg C, the latter extending slightly further from the center of the drum than the former. The cutter assembly as seen in FIGS. 2 and 3 would thus be rotated counterclockwise during the cutting of the pipe;

The cover plate 19 is provided with an opening 24 to pass chips cut from the pipe material by the cutting bit. The legs C and L of the bit 9 are preferably beveled along their leading edges as shown at 25 and 26, respectively. The beveled portion 25 of leg C thus directs chips through opening 24. The leading edge of leg L may trim off any unevenness along the sides of the cut, and the bevel 26 assists in clearing away such chips, or any chips left in the groove cut by the cutter.

The bit is shown in greater detail in FIGS. 7 – 11. Arrows 27 in FIGS. 7, 8 and 11 indicate the direction in which the bit moves. It will be seen that the cutting tip 28 of leg C extends outwardly beyond the end 29 of leg L. Typically, with the tool in operative position in a pipe, before cutting has commenced and with tip 28 engaged with the inner surface of the pipe, the end 29 of leg L will be, approximately, 0.006 inches from the pipe surface. If, as so measured, the length of leg L is more than 0.006 inches less than the length of leg C, taken to the cutting tip 28, chattering may be excessive. If leg L is only 0.002 inches shorter than leg C, harder materials may be cut and chattering is minimized but the time required to cut through the pipe wall will be increased. With certain pipe materials, with careful cutting speed adjustments, and with unworn bits carefully fitted in the drum recess, successful cuts may be made with as much as 0.01 inches difference in length between legs L and C, and it will be apparent that a difference in such length of less than 0.002 inches will provide an operative tool although the depth of cut per revolution would then be unnecessarily slow for PVC pipe or for materials of comparable thickness and hardness.

The face 30 of the bit is disposed toward cover plate 19, and, as seen in FIGS. 9 and 10, the end surface 29 of leg L and the end surface 31 of leg C are relieved or beveled away from face 30 at angles 32 and 33 of about 6° in each instance. The end surface 29 of leg L, as seen in FIGS. 7 and 8, is, preferably, in the plane of the bit, arcuate on substantially the radius of the drum 3. The planar surface 31 of leg C is relieved or beveled away from cutting tip 28 at an angle 34 of, typically, 18°, although this angle may be less for large diameter pipe, or for cutting harder and tougher materials than PVC, or if less strong materials are employed in the bit. A greater angle might be selected to slightly enhance the cutting speed or for small pipe, since, of course, the trailing end of the cutting leg face 31 should not touch the bottom of the groove being cut in the pipe.

It will be understood that the angles given for the ends of the bit legs are taken with respect to planes or lines normal to the longitudinal axis of the bit. The angles 35 and 36 of the bevels 25 and 26 shown in FIG. 11 are typically each 12° with respect to a plane perpendicular to the plane of the bit. The bit has, typically, a length equal to approximately the radius of the cutting head drum, and a maximum extension of approximately ½ inch. It may be ⅛ inch thick and ½ inch wide, and is formed of tool steel suitably tempered to hold a sharp cutting tip 28 and cutting edge though hundreds or thousands of cuts.

The cutting head assemble 12 is shown in FIG. 12 in operative position in PVC pipe 37, with bit 9 cutting into the pipe inner wall and producing chips 38 which fall freely through opening 24 in cover plate 19. The flange 6 of depth gauge drum 5 is engaged against the exposed upper end 39 of the pipe. The bodies of the drums 5 and 3 fit closely within the pipe whereby, even though edge 39 of the pipe may be uneven and not in a plane normal to the pipe axis, cutting bit 9 cuts off the pipe in such a plane.

In a typical installation, the pipe 37 is encased in a concrete floor 40 having a surface or level 41 below which the pipe is to be cut off. A space 42 surrounding the pipe and extending through and about one inch below surface 41 is provided to receive the tubular portion 43 of a finishing flange member 44.

FIG. 13 shows the pipe 37 as cut off to appropriate length and with flange member 44 in place with its tubular portion 43 glued or cemented by glue 45 to the pipe 37 to complete the installation ready for the reception of toilet or drain fittings.

The drums and the cover plate 19 may be machined from aluminum alloy or other metal, or may be more economically cast in substantially the final desired shape and then machine finished as is well known in the art.

While the drums may be completely solid as shown, it is, of course, possible to save weight and materials by forming the drums with hollows while leaving sufficient material by way of ribs or webs to provide appropriate strength and rigidity, particularly if the drums are made by casting.

It will be seen that, by providing a long shaft, the cutting head drum may be positioned to cut off the pipe as much as several feet from its end. If a long shaft is so employed, it may be desirable to provide one or more steadying collars, such as drums identical to drum 5 but without flange 6, along the shaft between the depth gauge and cutter head to minimize shaft whip.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An inside cutter for cutting off at a desired level below the concrete surface, plastic pipe of predetermined diameter encased in concrete, such pipe having an end exposed outwardly of the concrete surface, comprising, a shaft having an end portion adapted for connection to shaft rotating means, a cutting head drum and a guide drum mounted on said shaft, first means for mounting said guide drum on said shaft, second means for fixing said cutting head drum on said shaft for rotation therewith, one of said first and second means being selectively releaseable to permit adjustment of the distance between said drums, said guide drum comprising a cylindrical portion disposed toward said cutting head drum and an outwardly extending flange portion disposed away from said cutting head drum and adapted to engage the end surface of the exposed end of the pipe, said cutting head drum comprising a cylindrical body portion and a cutting bit movably supported thereon and projectable laterally thereof, said bit comprising a leading leg and a trailing cutting leg terminating outwardly in an outward cutting edge disposed outwardly a short distance beyond the outer end of said leading leg as measured radially from the axis of said cutting head drum, said cylindrical portion of said cutting head drum being proportioned to fit closely within and to be freely rotatable within the pipe, and spring means engaged between said body portion and said cutting bit oriented to urge said bit laterally outwardly of said cutting head drum operative to cause said cutting edge to cut to a depth limited by engagement of said leading leg with the inner surface of such pipe as said cutting head drum is rotated therein.

2. An inside cutter for plastic pipe of a predetermined internal diameter, comprising a cutter head drum, means comprising a shaft for mounting and rotating said drum, said drum being proportioned to fit closely and freely rotatably within said pipe, said shaft and drum being coaxial, a cutting bit, said drum having guide means extending perpendicularly radially of said axis of said shaft and drum, said bit being carried in said guide means, spring means between said drum and bit urging said bit outwardly along said guide means, the bit having a bifurcated outer end portion including a cutting leg and a leading depth-control leg lying in the same plane perpendicular to said axis, the cutting leg terminating outwardly in a cutting edge disposed at the edge of the cutting leg oriented toward the depth control leg and the depth control leg terminating outwardly at a distance from said axis of between about 0.002 and 0.010 inches less than the distance of said cutting edge from said axis.

3. The combination according to claim 2 wherein a depth gauge drum, having a body portion proportioned to fit closely within said pipe and a flange portion of greater diameter than said body portion and greater than said internal diameter of said pipe, is disposed on said shaft spacedly from said cutting head drum, and wherein selectively operative locking means is provided on one of said drums for locking said one drum along said shaft at an adjustable distance from the other said drum.

4. The combination according to claim 2 wherein said cutting bit has opposite faces and said cutting edge is beveled from one to the other of said faces.

5. The combination according to claim 4 wherein the end of said leading leg is beveled in the same direction and at the same angle as said cutting edge.

6. The combination according to claim 2 wherein said drum includes a cover plate detachably secured thereto, said cover plate forming a portion of said guide means and, upon removal, exposing said cutting bit for removal and replacement.

7. In an inside tube cutter comprising a body member adapted to be disposed and rotated on a predetermined axis in a predetermined direction inside a tube, a bifurcated cutting bit comprising a cutting leg and a leading cutting depth control leg, means slideably mounting said bit on said body member for sliding inwardly and outwardly thereof and with said legs extending outwardly of said member and lying in a plane normal to said rotational axis and with said leading leg disposed in said predetermined direction from said cutting leg, said cutting leg terminating outwardly in a cutting edge disposed outwardly a short distance beyond the outer end of said leading leg as measured radially from said axis, and spring means between said body and bit urging said bit outwardly from said body member.

8. The combination according to claim 7 wherein said mounting means mounts said bit for sliding radially with respect to said axis.

9. The combination according to claim 7 wherein said cutting leg extends outwardly between about 0.010 and 0.002 inches further than said cutting depth control leg as measured radially from said axis.

10. The combination according to claim 8 wherein said cutting leg extends outwardly between about 0.010 and 0.002 inches further than said cutting depth control leg as measured radially from said axis.

* * * * *